United States Patent [19]

Hara et al.

[11] Patent Number: 4,659,394
[45] Date of Patent: Apr. 21, 1987

[54] PROCESS FOR PREPARATION OF HIGHLY ANTICORROSIVE SURFACE-TREATED STEEL PLATE

[75] Inventors: Tomihiro Hara; Takeshi Adaniya, both of Yokohama; Masaaki Yamashita; Akira Enatsu, both of Kawasaki, all of Japan

[73] Assignee: Nippon Kokan Kabushiki Kaisha, Tokyo, Japan

[21] Appl. No.: 644,765

[22] Filed: Aug. 27, 1984

[30] Foreign Application Priority Data

Aug. 31, 1983 [JP] Japan .................. 58-157769
Aug. 31, 1983 [JP] Japan .................. 58-157770
Feb. 17, 1984 [JP] Japan .................. 59-28204

[51] Int. Cl.$^4$ ............................. C23C 22/24
[52] U.S. Cl. ............................. 148/6.2; 428/626; 428/623; 148/6.16
[58] Field of Search ................ 148/6.2, 6.16; 428/626, 428/623, 632, 629

[56] References Cited

U.S. PATENT DOCUMENTS 4,411,964 10/1983 Hara ................................. 428/626

FOREIGN PATENT DOCUMENTS 224174 12/1983 Japan .

Primary Examiner—Sam Silverberg
Attorney, Agent, or Firm—Frishauf, Holtz, Goodman & Woodward

[57] ABSTRACT

The present invention relates to a process for the preparation of a highly anticorrosive surface-treated steel plate. This process comprises the steps of subjecting a surface of a steel plate having a plating layer of the zinc or aluminum type deposited thereon to a chromate treatment to form a chromate film, treating the steel plate with an organic composite silica solution comprising an epoxy resin in an amount exceeding a certain level as an indispensable component and a curing agent optionally incorporated therein to form an organic composite silicate film comprising colloidal silica, organic resin and silane formed on the chromate film, and heat-treating the steel plate at a specific temperature.

25 Claims, 4 Drawing Figures

FIG_1(a)
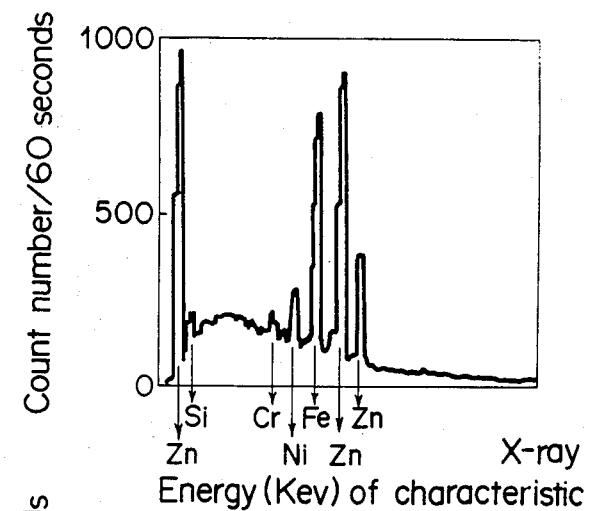
FIG_1(b)
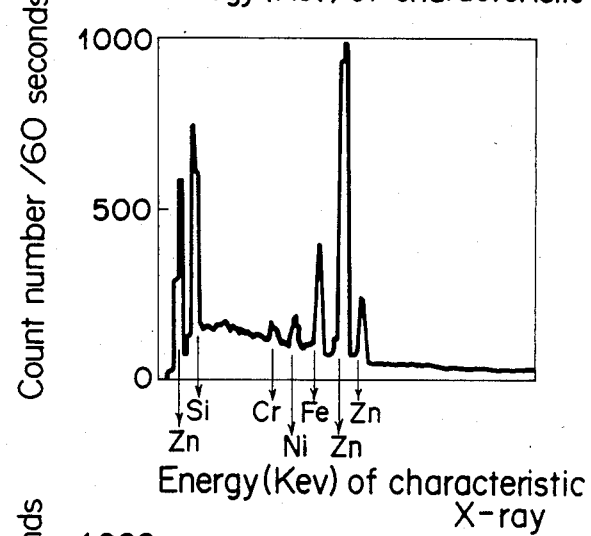
FIG_1(c)
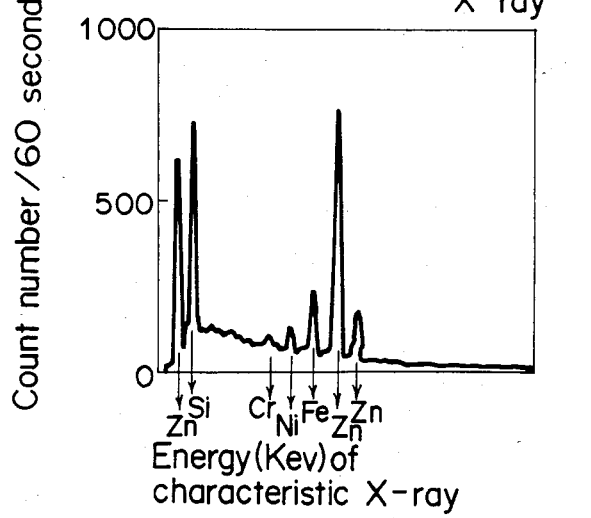

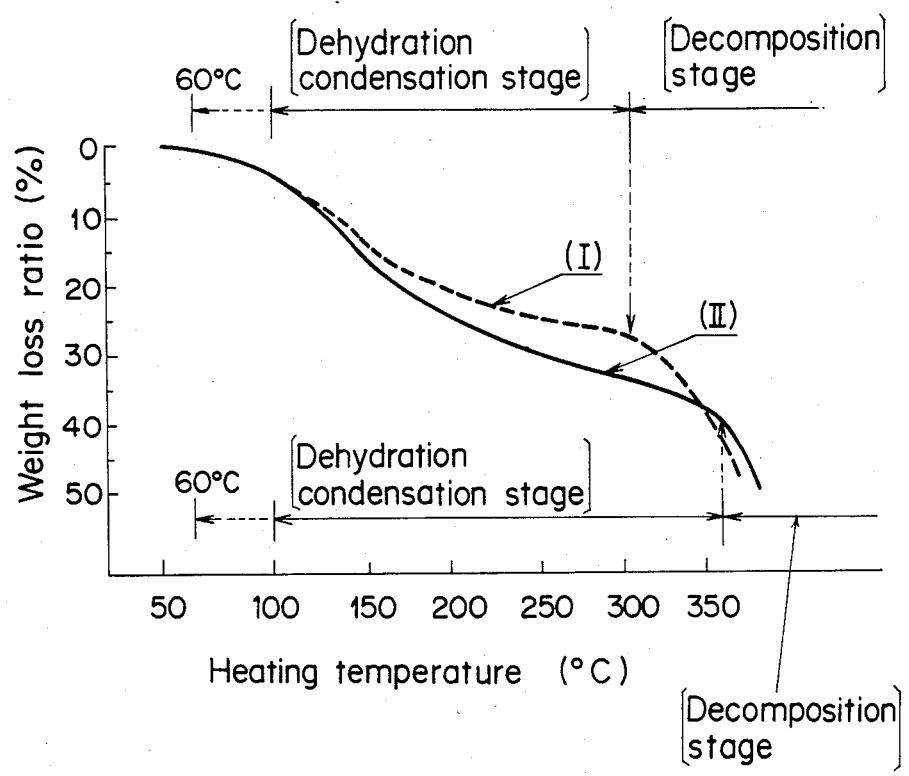

PROCESS FOR PREPARATION OF HIGHLY ANTICORROSIVE SURFACE-TREATED STEEL PLATE

BACKGROUND OF THE INVENTION

The present invention relates to a process for the preparation of a highly anticorrosive surface-treated steel plate, especially a rust-proof steel plate suitable for a car body.

Recently, a demand for a steel plate excellent in the corrosion resistance as a steel plate for a car body has been increasing, and there is observed a strong tendency to use a highly anticorrosive surface-treated steel plate instead of a cold-rolled steel plate heretofore used.

As this surface-treated steel plate, there can be mentioned a zinc-deposited steel plate. However, in case of a steel plate of this type, in order to increase the corrosion resistance, it is necessary to increase the amount deposited of zinc, and this increase of the amount deposited of zinc results in degradation of the processability and weldability. In order to eliminate this defect, there have been proposed a steel plate deposied with an alloy of zinc with at least one element selected from Ni, Fe, Mn, Mo, Co, Al and Cr and a multi-layer deposited steel plate. These steel plates are advantageous over the zinc-deposited steel plate in that the corrosion resistance can be improved without degradation of the weldability and processability. However, when these steel plates are applied to a bag structure portion or bent portion (hemmed portion) of an inner plate of a car body, for which a high corrosion resistance is required, the corrosion resistance is still insufficient. As the steel plate having a highcorrosion resistance, there has been developed a rust-proof steel plate having a zinc-rich coating, as disclosed in Japanese Patent Publication No. 24230/70 or No. 6882/72, and as a typical instance of the rust-proof steel plate, there is known Zinchrometal. However, even in case of this rust-proof coated steel plate, peeling of the coating film is sometimes caused in the portion subjected to processing such as pressing, and this steel plate is still insufficient as a highly anticorrosive rust-proof coated steel plate satisfying requirements for a material of a car body.

As means for eliminating the foregoing defects, there have been proposed a composite coated steel plate comprising a steel plate deposited with a plating layer of the zinc type as a substrate and a double coating layer of a chromate film and an organic composite silicate film formed thereon and a process for the preparation of this composite coated steel plate in Japanese Patent Application Laid-Open Specifications No. 108292/82 corresponding to U.S. Pat. No. 4,411,964 and No. 224174/83. This composite coated steel plate is excellent over the conventional surface-treated steel plates in the corrosion resistance and processability. However, if this steel plate is used for a car body, the adhesion to a cationic electrodeposition paint is poor and the corrosion resistance of the coating is not satisfactory.

The inner surfaces of many parts of a car body such as a door and a fender are ordinarily coated with a cationic electrodeposition paint, and a topcoat is applied onto the cationic electrodeposition coating on the outer or inner surfaces of the car body, for example, on the inner surface of a hood or the like. The adhesion to such a multiple coating should satisfy conditions severer than those required for the adhesion to the single cationic electrodeposition coating, and these conditions cannot be satisfied by the conventional composite coated steel plate.

In connection with the outer surface of a car body on which a composite coating of cationic electrodeposition coating/middle coating/top coating, the coating finish (appearance) and the adhesion of the coating are considered more important than the corrosion resistance. For this reason, cold-rolled steel plates have ordinarily been used. Recently, however, it is required to improve the corrosion resistance of the coating also for the outer surface of a car body, and this tendency is conspicuous in Canada and the United States. A steel plate deposited with a zinc or zinc alloy plating is suitable for improvement of the corrosion resistance of the coating. However, the steel plate of this type is inferior to a cold-rolled steel plate in the coating finish (cratering resistance: formation of pinhole-like defects on the cationic electrodeposition coating is called "cratering phenomenon", the cause of which is not clarified, this cratering phenomenon is caused on a steel plate deposited with zinc or a zinc alloy and this cratering phenomenon is observed also after middle coating-top coating and has serious influences on the coating finish) and the adhesion to the coating [water-resistant adhesion: this property is evaluated at the test of the coating adhesion under wet conditions where a sample coated even with a topcoat paint is immersed in pure water (deionized water) for a predetermined time (about 5 to about 10 days), 100 cross cuts extending to the substrate (steel) and having sides of 1 to 2 mm are formed on the coating, an adhesive tape is applied to the cross cuts and peeled and the number of cross cuts peeled together with the adhesive tape is counted; the cold-rolled steel plate is excellent in this water-resistance adhesion and the steel plate deposited with zinc or a zinc alloy is inferior]. Accordingly, practical application of the steel plate deposited with zinc or a zinc alloy is difficult.

As the rust-proof steel plate for a car body, there have been used a steel plate having one surface deposited and a steel plate having a rust-proof coating formed on one surface (in each steel plate, the other surface is the surface of the cold-rolled steel plate). However, these steel plates fail to satisfy the above-mentioned requirement of the corrosion resistance for the inner and outer surfaces of a car body. Accordingly, development of a highly anticorrosive rust-proof steel plate having basic properties required for the inner and outer surfaces (corrosion resistance, processability and spot weldability for the inner surface and coating finish property, coating adhesion, corrosion resistance of the coating, processability and spot weldability for the outer surface) has been desired.

The present invention has been completed as the result of researches made under the above background, and it is a primary object of the present invention to provide a process for the preparation of a highly anticorrosive surface-treated steel plate which is excellent in the corrosion resistance and processability and which has a good adhesion to a coating, especially a cationic electrodeposition paint, and enjoys a high corrosion resistance of the coating.

Another object of the present invention is to provide a process for the preparation of a highly anticorrosive surface-treated steel plate which has a good adhesion to a multiple coating of at least two coating layers, to which a higher adhesion than to the cationic electrodeposition coating is required, while maintaining high corrosion resistance and processability.

Still another object of the present invention is to provide a process for the preparation of a highly anticorrosive surface-treated steel plate which suitably satisfies the requirements of basic properties for the inner and outer surfaces of a car body.

SUMMARY OF THE INVENTION

According to the present invention, the foregoing objects can be attained by subjecting the surface of a steel plate deposited with a zinc type plating or aluminum type plating layer to a chromate treatment to form a chromate film, treating the steel plate with an organic composite silicate solution containing an epoxy resin at a concentration of at least 15% by weight based on the total solids to form an organic composite silicate film in an amount deposited of 0.5 to 4.0 g/m$^2$ on the chromate film and heat-treating the steel plate at a temperature of 100° to 300° C. The organic composite silicate referred to herein comprises an organic resin, a silica sol and a silane compound.

In the case where a severer adhesion to the coating, that is, a higher adhesion to a multiple coating of at least two coating layers, is required, the treatment is carried out with an organic composite silicate solution having an epoxy resin concentration of at least 26% by weight based on the total solids and an SiO$_2$/resin ratio of from 10/90 to 60/40 and the heat treatment is then carried out at 250° to 300° C.

A curing agent such as melamine may be added to the organic composite silicate solution. If the curing agent is used, the upper limit of the heat treatment temperature can be elevated to 350° C. and hence, the lower limit of the amount deposited of the organic composite silicate film can be lowered to 0.4 g/m$^2$. Addition of the curing agent is especially effective when a coated steel plate is prepared under the preparation conditions meeting the requirement of the adhesion to the coating, that is, under the conditions where the treatment is carried out with an organic composite silicate solution having an epoxy resin concentration of at least 26% by weight based on the total solids and an SiO$_2$/resin ratio of from 10/90 to 60/40 and the heat treatment is then carried out at a temperature of 250° to 300° C.

In the surface-treated steel plate prepared according to the above-mentioned process, a high corrosion resistance is obtained by chromate and organic composite silicate films densified by the heat treatment, and by the presence of an epoxy resin contained in an amount exceeding a certain level as an indispensable component in the organic composite silicate and also by the effect of the heat treatment, an excellent adhesion to a coating, especially a cationic electrodeposition coating, can be obtained.

Especially when the above-mentioned severer preparation conditions are adopted, the above-mentioned effects are enhanced and hence, the adhesion to a multiple coating of at least two coating layers is highly improved.

When a curing agent is added to the organic composite silicate solution, the heat decomposition temperature of the organic composite silicate film at the heat treatment is shifted to a higher temperature side, and the heat treatment at a higher temperature becomes possible. If the heat treatment is carried out at a higher temperature, the crosslinking reaction of the organic composite silicate is promoted, with the result that the corrosion resistance and the adhesion to the coating are further improved.

When the treatment of the present invention is conducted only on one surface of a steel plate and a plating layer of the zinc type or zinc alloy type (Zn—Fe, Zn—Ni, Zn—Mn, Zn—Al or the like) is kept on the other surface, the basic properties required for the inner and outer surfaces of a car body are sufficiently manifested, and especially when a plating layer of the iron type or the iron-zinc alloy type having an iron content of at least 50% by weight is deposited on a plating layer of the zinc type on the other surface corresponding to the outer surface of a car body, there can be obtained a surface-treated steel plate in which the requirements of the basic properties for the inner and outer surfaces of a car body are more suitably satisfied.

BRIEF DESCRIPTION OF THE DRAWINGS

FIGS. 1-(A) through 1-(C) are charts of an X-ray microanalyzer obtained when cationic electrodeposition coating-peeled portions are inspected.

FIG. 2 is a diagram illustrating the relation between the temperature for heating the organic composite silicate and the ratio of the weight loss by heating.

DETAILED DESCRIPTION OF THE INVENTION

The present invention will now be described in detail.

As pointed out hereinbefore, in case of a car body, the coating on the inner surfaces of relatively many parts such as a door and a fender is composed solely of a cationic electrodeposition coating layer, and on the outer surface of a car body and the inner surfaces of such members as a hood, a double or triple coating including another coating layer formed on the cationic electrodeposition coating layer is ordinarily formed.

The gist of the present invention resides in a process for the preparation of a surface-treated steel plate which is excellent in not only the corrosion resistance and processability but also the adhesion to the cationic electrodeposition coating. The treatment to be applied to a single layer of the cationic electrodeposition coating, however, is insufficient for a multiple coating including a cationic electrodeposition coating layer, and severer requirements should be satisfied. The present invention provides a preparation process which is conducted under such severe conditions as will produce an excellent adhesion to a multiple coating including at least two layers.

In accordance with the fundamental aspect of the present invention, there is provided a process for the preparation of a highly anticorrosive surface-treated steel plate, which comprises subjecting a plated surface of a steel plate having a plating layer of the zinc or aluminum type as a substrate to the following treatments:
  (a) subjecting the steel plate to a chromate treatment to form a chromate film,
  (b) treating the steel plate with an organic composite silicate solution containing an epoxy resin in an amount of at least 15% by weight based on the total solids, in which a curing agent may be incorporated according to need, to form an organic composite silicate film in an amount deposited of 0.5 to 4.0 g/m$^2$ or 0.4 to 4.0 g/m$^2$ when the curing agent is incorporated, on the chromate film, and
  (c) heat-treatment the steel plate at a temperature of 100° to 300° C. or a temperature of 100° to 350° C.

when the curing agent is incorporated in the organic composite silicate solution.

In the case where severer adhesion conditions are required, that is, an excellent adhesion to a multiple coating of at least two coating layers is desired, a plated surface of a steel plate having a plating layer of the zinc or aluminum type as a substrate to the following treatments under restricted conditions:

(i) subjecting the steel plate to a chromate treatment to form a chromate film, (ii) treating the steel plate with an organic composite silicate solution containing an epoxy resin in an amount of at least 26% by weight based on the total solids and having an $SiO_2$/resin ratio of from 10/90 to 60/40, in which a curing agent may be incorporated according to need, to form an organic composite silicate film in an amount deposited of 0.5 to 4.0 $g/m^2$ or 0.4 to 4.0 $g/m^2$ when the curing agent is incorporated, on the chromate film, and (iii) heat-treating the steel plate at a temperature of 250° to 300° C. or 250° to 350° C. when the curing agent is incorporated in the organic composite silicate.

As the steel plate having a plating layer of the zinc type as the substrate, there may be used a zinc-deposited steel plate, a zinc-iron alloy-deposited steel plate, a zinc-nickel alloy-deposited steel plate, a zinc-manganese alloy-deposited steel plate, a znc-aluminum alloy-deposited steel plate and a zinc-cobalt-chromium alloy-deposited steel plate. Furthermore, at least one element selected from Ni, Fe, Mn, Mo, Co, Al and Cr may be incorporated into the above-mentioned metals to be deposited. Moreover, a composite deposited steel plate having at least two same or different plating layers selected from the above-mentioned plating layers may be used.

As the plating means for obtaining the steel plate having a plating layer of the zinc type, there may be adopted an electrolytic plating method, a melting method and a gas phase plating method. The rust-proof steel plate intended in the present invention is mainly used for a car body and in this field, it is important that the properties of the cold-rolled steel plate to be plated should not be impaired. In view of this importance, it is preferred that the electric plating method in which no heat is generated be adopted.

In the present invention, the plating layer deposited on the substrate steel plate has great influences on the corrosion resistance of the steel plate. Among the above-mentioned plating layers, the steel plate deposited with zinc alone is relatively poor in the corrosion resistance, and the steel plates deposited with zinc alloys, especially Ni—Zn and Zn—Mn alloys, and these alloys containing, incorporated therein, at least one plating element as described above are excellent in the corrosion resistance and attainment of a highly improved corrosion resistance can be expected by use of these deposited steel plates as the substrate.

These alloy deposition layers may be formed under conditions described below. Ni—Zn alloy deposition is ordinarily carried out according to the electrolytic plating method, and the content of Ni in the alloy to be plated is ordinarily 1 to 90% by weight, preferably 5 to 30% by weight. Fe—Zn alloy deposition is ordinarily carried out according to the electrolytic plating or melting method, and the Fe content in the alloy to be plated is ordinarily 1 to 70% by weight and an Fe content of 5 to 35% by weight is preferred from the viewpoint of the corrosion resistance. Zn—Mn alloy deposition is carried out according to the electrolytic method, and the Mn content in the alloy to be deposited is ordinarily 20 to 90% by weight and preferably 30 to 85% by weight. Zn—Al alloy deposition is ordinarily carried out according to the melting method, and the Al content in the alloy to be plated is 2 to 60% by weight. In case of Zn—Co—Cr alloy deposition, the Co and Cr contents in the alloy to be plated are 0.01 to 15% by weight and 0.01 to 1% by weight, respectively. In the case where two or more of plating layers are deposited, the contents of the plating metals should preferably be controlled within the above-mentioned ranges in the respective layers.

In the above-mentioned deposited steel plate, it is preferred that the amount deposited of the plating layer be at least 1 $g/m^2$ on one surface. If the amount deposited of the plating layer is smaller than 1 $g/m^2$ on one surface, there is a risk of reduction of the corrosion resistance. Even if the amount deposited of the plating layer exceeds 300 $g/m^2$, no high improvement of the corrosion resistance can be expected but the cost is increased. When the above-mentioned electric plating method is adopted, it is preferred that the amount deposited of the plating layer be 5 to 60 $g/m^2$ on one surface.

According to the present invention, the plated surface of the steel plate is subjected to a chromate treatment to form a chromate film on the plated surface. It is preferred that the amount deposited (dry amount) of chromium in the chromate film be 1 to 1000 $mg/m^2$ (as metallic chromium). If the amount deposited of chromium exceeds 1000 $mg/m^2$, the processability and weldability are degraded, and if the amount deposited of chromium is smaller than 1 $mg/m^2$, the chromate film becomes uneven and no good results can be obtained. In order to obtain good processability and weldability and a high evenness of the film simultaneously, it is preferred that the amount deposited of chromium be 10 to 200 $mg/m^2$, especially 20 to 90 $mg/m^2$.

This chromate treatment for formation of the undercoating film may be carried out according to any of known methods, such as the reaction type chromate treatment method, the coating type chromate treatment method and the electrolytic chromate treatment method.

As the reaction type chromate treatment solution, there may be used, for example, a solution formed by incorporating at least one mineral acid (selected from $H_2SO_4$, $H_2PO_4$, HF and silicofluoric acid) as the main reaction-promoting component into chromic acid or the like. A solution having a pH value adjusted to 0.5 to 2.0 and a $Cr^{3+}/Cr^{6+}$ ratio of from 1/1 to 1/10 is ordinarily used. If the deposited steel plate is immersed in or sprayed with this treatment solution for a predetermined time, reaction is caused between the plated surface and the treatment solution to form a chromate film. The unreacted substance is then rempved by water washing and the treated steel plate is dried to obtain a chromate film.

The coating type treatment solution comprises a partially reduced chromic acid solution as the main component and contains, incorporated therein, an organic resin such as a water-dispersible or water-soluble acrylic resin and/or silica particles (silica sol or fumed silica) having a particle size of from scores of Å to several thousand Å according to need. In this case, it is preferred that the $Cr^{3+}/Cr^{6+}$ ratio be from 1/1 to ⅓ and the pH value be 1.5 to 4.0, especially 2 to 3. The $Cr^{3+}/Cr^{6+}$ ratio may be adjusted to a desired value by using an ordinary organic reducing agent such as a saccharide or an alcohol or an ordinary inorganic reducing agent. Any of the roll coater method, the dipping method and the spraying method may be adopted for the coating type chromate treatment. In case of the coating type chromate treatment, the treated steel plate is dried after the chromate treatment and a chromate film is obtained without performing water washing. The reason why drying is carried out without performing water washing is that since $Cr^{6+}$ is not removed by ordinary water washing, the $Cr^{3+}/Cr^{6+}$ ratio is stably maintained and the treatment is conducted with an organic composite silicate solution at the subsequent step to effect sealing.

In case of the electrolytic chromate treatment, the plated surface is subjected to a cathodic electrolytic treatment with a solution comprising chromic anhydride and at least one anion selected from sulfuric acid, phosphoric acid, a fluoride and a halogen oxyacid, and the treated steel plate is washed with water and dried to obtain a chromate film.

When chromate films obtained according to the above-mentioned three chromate treatment methods are compared with each other, the reaction type chromate film is obtained relatively easily because the reaction type chromate treatment is a known technique which is generally adopted in various fields, though it is difficult to treat only one surface. Since the coating type chromate film contains hexavalent chromium in a larger amount than in the electrolytic chromate film, the coating type chromate is excellent in the corrosion resistance. In other words, it is preferred that hexavalent chromium be present in the chromate film. By the action of $Cr^{6+}$, the crosslinking of the film is promoted at the organic composite silicate treatment of the subsequent step and the film is strengthened. Moreover, $Cr^{6+}$ has a repairing action and when the steel plate is impaired, $Cr^{6+}$ inhibits advance of corrosion from the impaired portion. When the coating type chromate film is subjected to the heat treatment described hereinafter, the film is densified and strengthened, and hence, there is attained a higher corrosion resistance than in case of the reaction type chromate film or electrolytic chromate film. The electrolytic chromate treatment is advantageous in that the amount deposited of the chromate film can easily be controlled. In view of the ccorrosion resistance, the coating type chromate film is most preferred. A steel plate having one surface treated is often used as the rust-proof steel plate for a car body. In view of this fact, the coating type chromate treatment and the electrolytic chromate treatment are preferred.

After the above-mentioned chromate treatment, the treatment is carried out with an organic composite silicate solution, whereby an organic composite silicate film is formed on the chromate film. As pointed out hereinbefore, the organic composite silicate comprises an organic resin, a silica sol and a silane compound.

The intended rust-proof steel plate of the present invention is mainly used for a car body, and cationic electrdeposition coating is ordinarily performed on both the inner and outer surfaces of a car body. In view of this fact, according to the present invention, the chromate-treated steel plate is subjected to a treatment with an organic composite silicate solution having an epoxy resin concentration adjusted to at least 15% by weight based on the total solids to obtain a film containing an epoxy resin in a specific amount.

In the coated steel plate obtained according to the present invention, that is, the steel plate comprising a deposited steel plate, a chromate film and an organic composite silicate film, the adhesion to a cationic electrodeposition coating layer is determined by the properties of the organic composite silicate film as the topcoat. When we examined the peeled surfaces at the adhesion test conducted after cationic electrodeposition coating, it was found that peeling of the cationic electrodeposition coating layer is due to the cohesive failure of the organic composite silicate and the fracture of the interface between the organic composite silicate and the cationic electrodeposition coating layer. FIGS. 1-(A) through 1-(C) are charts of an X-ray microanalyzer (XMA). FIG. 1-(A) is a chart obtained when a coating type chromate film was formed on a starting deposited steel plate having Ni—Zn deposited in an amount of 30 g/m² and FIG. 1-(B) is a chart obtained when an organic composite silicate was coated on the above chromate film. When both the charts are compared, it is seen that although the peak of Si is very slight on the chromate surface of FIG. 1-(A), the peak of Si is prominent in FIG. 1-(B) obtained when the organic composite silicate was further coated. FIG. 1-(C) is an XMA chart of the peeled surface obtained when chromate and organic composite silicate films were formed on the starting deposited steel plate and an adhesive tape was applied and peeled at the adhesion test. The pattern is substantially the same as the pattern of FIG. 1-(B) (the organic composite silicate-coated surface). Accordingly, it is seen that peeling of the cationic electrodeposition coating layer is peeling on the interface between the cationic electrodeposition coating layer and the organic composite silicate. When this peeled surface was examined by an operation type electron microscope, it was found that cohesive failure of the organic composite silicate partially takes place. This tendency is observed irrespectively of the kind of the starting deposited steel plate and the kind of the chromate treatment conducted on the starting deposited steel plate.

When the relation between the organic composite silicate component and the adhesion to the cationic electrodeposition coating layer was examined based on the foregoing facts, it was found that if an epoxy resin is incorporated into the organic composite silicate in an amount of at least 15% by weight based on the total solids, a good adhesion can be obtained. It is considered that the adhesion to the cationic electrodeposition coating layer is improved for the following reasons. In the first place, since an epoxy resin is contained in a cationic electrodeposition paint and the epoxy resin is contained in the organic composite silicate in an amount exceeding a certain level, a strong mutual action is obtained between the epoxy resin in the cationic electrodeposition paint and the epoxy resin in the organic composite silicate and hence, a high adhesion is obtained in the interface between the cationic electrodeposition coating layer and the organic composite silicate film. In the second place, since the epoxy resin is contained in the organic composite silicate in an amount exceeding a certain level, the organic composite silicate film per se is strengthened by the epoxy resin and occurrence of the cohesive failure is effectively prevented. This effect is appropriately obtained when the epoxy resin is incorporated in an amount of at least 15% by weight based on the total solids.

In the present invention, the organic composite silicate contains at least 15% by weight of an epoxy resin, and a epoxy resin composite silicate or a mixture of an epoxy resin composite silicate with at least one other organic composite silicate is preferably used.

It is preferred that in the organic composite silicate, the $SiO_2$/organic resin weight ratio be from 95/5 to 5/95, especially from 60/40 to 10/90. The reason why the weight ratio between $SiO_2$ and the organic resin is thus controlled is that the $SiO_2$ component and the organic resin component are effective for improving the corrosion resistance and the coating adhesion, respectively. Accordingly, this weight ratio is especially important when a high adhesion to a multiple coating layer of at least two layers, as described hereinafter, is obtained as well as a high corrosion resistance.

In the present invention, a curing agent such as melamine may be added to the above-mentioned organic composite silicate solution. When the curing agent is thus added to the organic composite silicate solution, the critical decomposition temperature of the organic composite silicate film by heating is shifted to a high temperature side, and a heat treatment at a higher temperature becomes possible. If heating is carried out at a higher temperature, the adhesion is further enhanced for the above-mentioned reason.

Addition of the curing agent is especially effective when it is desired to obtain a good adhesion to a multiple coating including at least two layers. Namely, if addition of the curing agent is combined with adoption of treatment conditions, described hereinafter, for obtaining a good adhesion to a multiple coating layer, a particularly high effect can be attained. This feature will be described in detail hereinafter.

The amount deposited of the organic composite silicate film is adjusted to 0.5 to 4.0 g/m$^2$ (on the dry base; the same will apply hereinafter), if the curing agent is not added. If the amount deposited of the organic composite silicate film is smaller than 0.5 g/m$^2$, no sufficient corrosion resistance can be obtained. If the amount deposited of the organic composite silicate exceeds 4.0 g/m$^2$, the spot weldability is degraded. If it is desired to obtain a good spot weldability assuredly, it is preferred that the amount deposited of the organic composite silicate be smaller than 3.0 g/m$^2$.

If a curing agent such as melamine is added to the organic composite silicate, since the adhesion and corrosion resistance are improved by the addition of the curing agent, the lower limit of the amount deposited of the organic composite silicate may be reduced to 0.4 g/m$^2$. As pointed out hereinbefore, reduction of the amount deposited of the organic composite silicate results in improvement of the spot weldability. Accordingly, the curing agent-incorporated organic composite silicate film is excellent in that predetermined adhesion and corrosion resistance can be obtained even if the amount deposited of the organic composite silicate is small. Therefore, when the curing agent is incorporated in the organic composite silicate, the amount deposited on the organic composite silicate film is adjusted to 0.4 to 4.0 g/m$^2$.

The organic composite silicate comprises water-dispersible silica as an indispensable component, and the organic composite silicate is obtained by mixing water-dispersible silica with an organic polymeric resin in the presence of a silane compound and reacting them at a temperature in the range of from 10° C. to the boiling point, preferably from 50° to 90° C. The water-dispersible silica is so-called silica sol or colloidal silica having a particle size of from scores of Å to several thousand Å. The silane compound acts as a reaction promoter when the silica is combined with the organic resin. A commercially available silane coupling agent may be used as the silane compound. For example, there can be used trialkoxysilanes such as vinyltriethoxysilane, vinyltris($\beta$-methoxyethoxy)silane, $\gamma$-glycidoxypropyltriethoxysilane, $\gamma$-methacryloxypropyltrimethoxysilane, N-$\beta$-(aminoethyl)-$\gamma$-aminopropyltrimethoxysilane and $\gamma$-aminopropyltriethoxysilane.

As the water-soluble or water-dispersible organic polymeric resin, there can be mentioned, for example, polyvinyl alcohol, hydroxyethyl cellulose, a polyester, an alkyd resin, an epoxy resin and an acrylic copolymer. As pointed out hereinbefore, in the present invention, the epoxy resin is an indispensable component. As the epoxy resin, there can be mentioned a fatty acid-modified epoxy resin, a polybasic acid-modified epoxy resin, an acrylic resin-modified epoxy resin, an alkyd resin-modified epoxy resin, a phenolic resin-modified epoxy resin, a polybutadiene resin-modified epoxy resin and an amine-modified epoxy resin. An amine compound or ammonium compound may be added so as to render the foregoing organic resins water-soluble or water-dispersible.

As pointed out hereinbefore, the weight ratio of the water-dispersible silica to the water-soluble or water-dispersible organic resin in the organic composite silicate is in the range of from 5/95 to 95/5, preferably from 10/90 to 60/40. It is preferred that the silane compound be added in an amount of 0.5 to 15% by weight based on the total solids of the silica and organic resin.

One or more of organic composite silicates obtained according to the foregoing procedures may be used, as pointed out hereinbefore. An oxyacid of molybdenum, tungsten or vanadium, a salt thereof or an alkoxide chelate of titanium or zirconium may be added to the organic composite silicate. If at least one of such additives is added in an amount of up to 14% by weight, preferably 0.2 to 8% by weight, based on the total solids of $SiO_2$ and the organic resin, the corrosion resistance can further be improved.

A roll coating method, a spray coating method or other coating method may optionally be adopted for coating the organic composite silicate solution. After the coating operation, the coated steel plate is dried to form an organic composite silicate film.

In the present invention, after the above-mentioned treatment with the organic composite silicate solution, the heat treatment is carried out at a temperature of 100° to 300° C. or at a temperature of up to 350° C. as the upper limit when the curing agent is added to the organic composite silicate solution. The reason why the heat treatment temperature is thus limited is that if the heat treatment temperature is lower than 100° C., no sufficient corrosion resistance or coating adhesion can be obtained and if the treatment temperature exceeds the upper limit of 300° or 350° C., the organic composite silicate film is thermally decomposed and the weight loss is caused. As pointed out hereinbefore, if the curing agent is added, the upper limit of the treatment temperature for prevention of the thermal decomposition is shifted to the high temperature side, and the heat treatment may be carried out at a temperature of about 350° C. at highest.

It is considered that the corrosion resistance is improved by the heat treatment for the following two reasons. In the first place, the chromate film as the undercoat is densified by the heat treatment and the corrosion resistance is improved. Namely, such reactions as reduction of $Cr^{6+}$ and dehydration are caused by the heat treatment, and a dense chromic chromate film is formed. In the case where silica and/or the organic resin is contained in the chromate film, crosslinking is caused between chromium and these components by the heat treatment, and hence, the chromate film is densified to increase the corrosion resistance. In the second place, the organic composite silicate per se is strengthened. Namely, dehydrataion condensation is caused in the organic composite silicate by the heat treatment to increase the crosslinking density. In contrast, if the organic composite silicate is dried and cured at normal temperature, the crosslinking density is not sufficient and the organic composite silicate film is readily swollen in a wetting atmosphere or the organic composite silicate film is readily deteriorated by alkali degreasing because of a poor alkali resistance. In addition to the foregoing two main reasons, in the case where $Cr^{6+}$ is present in the chromate film as the undercoat, this $Cr^{6+}$ is reacted with a polar group in the organic composite silicate, such as a hydroxyl group or carboxyl group, by the heat treatment and the crosslinking is further advanced to improve the corrosion resistance.

FIG. 2 is a graph showing the results obtained when the relation between the heating temperature and the ratio of the weight loss of the organic composite silicate by the above-mentioned dehydration condensation. As pointed out hereinbefore, curing of the organic composite silicate is caused by dehydration condensation, and the reaction ratio is proportional to the ratio of the weight loss. Test conditions adopted for obtaining the results shown in Table 2 are as follows.

Organic composite silicate:
$SiO_2$/organic resin weight ratio=40/60
Acrylic resin/epoxy resin weight ratio=50/50
Temperature-elevating rate:
20° C./min
Preparation of sample:
5 cc of an organic composite silicate solution was charged in a 200-ml beaker and was dried in a desiccator for 3 days, and about 200 g of the solution was sampled and used for the measurement.

In FIG. 2, curve (I) shows the results obtained when a curing agent was not added, and curve (II) shows the results obtained when melamine was added as the curing agent in an amount of 3 parts by weight per 100 parts by weight of the epoxy resin. From FIG. 2, it is seen that the weight loss begins at about 60° C. and becomes conspicuous at temperatures higher than 100° C. The weight loss at temperatures lower than 100° C. is due mainly to evaporation of water, and substantial dehydration condensation is caused at temperatures higher than 100° C. In the curve (I) obtained when the curing agent was not added, the weight is drastically reduced if the temperature exceeds 300° C. and it is seen that thermal decomposition of the silicate is initiated. Therefore, it is understood that when the curing agent is not added, the temperature for heating the organic composite silicate should be 100° to 300° C., preferably 200° to 300° C. In the curve (II) obtained when melamine was added in an amount of 3% by weight as the curing agent, the time of initiation of the dehydration condensation reaction is substantially the same as in the curve (I) obtained when the curing agent was not added, but with elevation of the temperature, the weight loss by the dehydration condensation reaction is increased and made larger than in the curve (I), and this tendency is especially conspicuous at temperatures higher than 230° C. Furthermore, in the curve (II) obtained when the curing agent was added, the thermal decomposition temperature is shifted to the high temperature side and it is seen that heating may be performed at temperatures of up to 350° C. From the curve (II) obtained when the curing agent was added, it is seen that thermal decomposition is caused at a temperature exceeding 350° C., and thermal decomposition becomes conspicuous at about 360° C. Thus, it will be understood that the temperature for heating the organic composite silicate in which the curing agent is incorporated is suitably 100° to 350° C. Incidentally, if the heating temperature is lower than 230° C., the unreacted curing agent is left free and attainment of an adhesion corresponding to the weight loss can hardly be expected. Accordingly, in order to sufficiently enjoy the merit by the addition of the curing agent, it is preferred that the heating temperature be at least 230° C.

In the above-mentioned heat treatment, it is preferred that after heating the steel plate at a predetermined temperature, this temperature be maintained within several seconds to several minutes. Long-time maintenance of this temperature is not preferred from the economical viewpoint and there is a risk of degradation of the properties.

The foregoing preparation conditions are ordinary conditions adopted in the present invention for attaining a good adhesion to a cationic electrodeposition coating layer. However, these conditions are still insufficient for obtaining an excellent adhesion to a multiple electrodeposition coating including two or thress layers but more restricted preparation conditions are required.

More specifically, in order to attain a high adhesion to a multple coating of at least two layers, the $SiO_2$/organic resin weight ratio in the organic composite silicate should be in the range of from 10/90 to 60/40, preferably from 20/80 to 50/50, the amount of the epoxy resin should be at least 26% by weight, preferably at least 35% by weight, based on the total solids in the organic composite silicate, and the temperature of the heat treatment conducted after the organic composite silicate solution treatment should be at least 250° C.

If the epoxy resin concentration in the organic composite silicate is thus increased, a strong mutual action is manifested between this epoxy resin and the epoxy resin in the cationic electrodeposition coating and a high coating adhesion is obtained. Furthermore, if the epoxy resin content in the organic composite silicate is increased, the critical thermal decomposition temperature for the resin is shifted to the high temperature side and the heat treatment can be carried out at a higher temperature. Accordingly, by this high temperature heat treatment, crosslinking of the organic composite silicate is promoted, resulting in improvement of the adhesion. More specifically, the cationic electrodeposition coating is characterized in that the coated interface becomes alkaline, and an organic composite silicate film is ordinarily poor in the resistance to an alkaline environment and is readily softened and swollen by the alkaline characteristic of the interface formed by the cationic electrodeposition coating and this is a main cause of inhibition of attainment of a good adhesion. Furthermore, in the case of a multiple coating of at least two layers where a topcoat is applied to a cationic electrodeposition coating layer, since the coating film thickness on the steel plate is increased, the internal stress is increased and this increase of the internal stress is a large cause of reduction of the adhesion. In order to cope with these problems concerning the adhesion, according to the present invention, crosslinking is promoted to increase the crosslinking density and reduction of the adhesion to the coating layer due to softening and swelling under an alkaline environment or to generation of the internal stress is controlled.

Furthermore, as pointed out hereinbefore, since the $SiO_2$ component and the organic resin component in the organic composite silicate are effective for improving the corrosion resistance and the adhesion to the coating, respectively, in order to attain a good adhesion to a multiple coating of two or three layers with a good corrosion resistance, to which atainment of a good adhesion is very difficult, control of the $SiO_2$/organic resin weight ratio is indispensable. If this weight ratio exceeds 60/40, the corrosion resistance is increased but the adhesion becomes insufficient. In contrast, if this weight ratio is lower than 10/90, the corrosion resistance is degraded. Accordingly, the $SiO_2$/organic resin weight ratio should be adjusted within the range of from 60/40 to 10/90, preferably from 50/50 to 20/80.

In the case where a multiple coating including at least two layers is intended, as pointed out hereinbefore, incorporation of a curing agent such as melamine into an organic composite silicate solution is recommeneded. As described hereinafter, if it is desired to attain a good adhesion to a multiple coating of at least two layers, the lower limit of the heat treatment temperature is elevated and the heat treatment is carried out at a higher temperature, and in this case, the incorporated curing agent exerts functions of promoting the curing of the organic composite silicate film and enhancing the adhesion of the organic composite silicate film per se. Moreover, the curing agent exerts a function of shifting the critical thermal decomposition temperature of the organic composite silicate film to a high temperature side and it becomes possible to perform the heat treatment at a higher temperature where a high adhesion is attained.

As the curing agent to be incorporated, there can be mentioned a blocked isocyanate, urea, malamine and a phenol. Furthermore, a polyamide, an amino resin, an amine, an organic acid, an inorganic acid, an alcohol, a mercaptan and an acid anhydride may be used.

The curing agent is incorporated in an amount of 0.1 to 100 parts by weight, preferably 0.3 to 50 parts by weight, per 100 parts by weight of the epoxy resin in the organic composite silicate. If the curing agent is incorporated in too large an amount, the free curing agent not reacted with the epoxy resin inhibits the adhesion. Therefore, the upper limit of the amount incorporated of the curing agent is preferably set at 100 parts by weight per 100 parts by weight of the epoxy resin.

The lower limit of the temperature for the heat treatment of the organic composite silicate is set at 250° C. and the heat treatment temperature is adjusted within the range of from 250° to 300° C., and in the case where the curing agent is incorporated, the heat treatment is carried out at a temperature within the range of from 250° to 350° C. When improvement of the adhesion to a multiple coating including at least two layers is intended, heating at a relatively low temperature not higher than 250° C. is insufficient and attainment of a satisfactory adhesion cannot be expected.

The above-mentioned plating treatment, chromate treatment and organic composite solution treatment may be conducted on both the surfaces or one surface of a steel plate. The steel plate prepared according to the present invention includes, for example, the following embodiments.

(1) One surface: plating layer/chromate film/organic composite silicate film Other surface: Fe surface
(2) One surface: plating layer/chromate film/organic composite silicate film Other surface: plated surface
(3) Both Surfaces: plating layer/chromate film/organic composite silicate film The above-mentioned steel plate (2) has the basic properties required for the inner and outer surfaces of a car body. Namely, it is preferred that one surface of the steel plate to be formed into an inner surface of a car body be treated according to the present invention to form a plating layer, a chromate film and an organic composite silicate film and the other surface of the steel plate to be formed into an outer surface of a car body be deposited with zinc or a zinc alloy to form a plating layer. It is especially preferred that the other surface of the steel plate be subjected to at least two plating treatments to form (a) a zinc plating film in an amount deposited of 1 to 60 g/m$^2$ on the lower side and (b) a plating layer film of iron or an iron-zinc alloy having an iron content of at least 50% by weight as the topmost layer. According to this preferred embodiment, there is obtained a steel plate having both the surfaces treated, in which one surface (corresponding to the inner surface of a car body) has a higher corrosion resistance than that of a rust-proof steel plate such as Zinchrometal and the other surface (corresponding to the outer surface of a car body) is comparable to a cold-rolled steel plate in the coating finish property and the adhesion to the coating and is much superior to a cold-rolled steel plate in the corrosion resistance (red rust resistance).

If a composite plating film is formed on the surface of the steel plate to be formed into the outer surface of a car body by depositing a plurality of plating layers appropriately so that various properties required for the outer surface of a carbody can effectively be manifested, high cratering resistance, water-rsistant adhesion and corrosion resistance can simultaneously be attained very satisfactorily.

The zinc type plating film on the lower side is formed so as to improve the corrosion resistance (red rust resistance and blister resistance) and this plating film has a single-layer or multi-layer structure of a zinc plating or a zinc-based alloy plating. The zinc-based alloy plating is especially excellent in the corrosion resistance, and an Fe—Zn alloy plating (the Fe content is up to 40%, preferably 5 to 35%), an Ni—Zn alloy plating (the Ni content is 5 to 20%) and an Mn—Zn alloy plating (the Mn content is 30 to 85%) are especially preferred. The above-mentioned iron, nickel and manganese contents in the foregoing zinc alloys are determined in view of the corrosion resistance. If these contents are outside the above range and too high or too low, the corrosion resistance is degraded and no good results can be obtained. At least one of the above-mentioned zinc and zinc alloy layers is deposited in the form of a single layer or multiple layer coating.

The topmost plating film deposited on the above-mentioned plating film on the lower side is a plating film of iron or an iron-zinc alloy having an Fe content of at least 50% by weight and this plating film is formed so as to improve the cratering resistance and water-resistant adhesion of the surface to be coated (the outer surface).

The mechanism of occurrence of cratering and degradation of the water-resistant adhesion in a zinc- or zinc alloy-deposited steel plate has not been completely elucidated. However, we noted that these properties are good in a cold-rolled steel plate and cratering takes place at the cationic electrodeposition step, and when samples where the water-resistant adhesion was degraded were examined, it was found that peeling of the interface was due to fracture of the interface between the phosphate film and the cationic electrodeposition coating film or the cohesive failure of the phosphate film. While taking the foregoing facts into consideration, we selected the topmost plating film in the following manner.

In the first place, we presumed that the difference of the water-resistant adhesion and cratering resistance between a cold-rolled steel plate and a zinc- or zinc alloy-deposited steel plate would be due to the surface layer of the material and the composition and crystal structure of a phosphate film formed by reaction. The difference of the surface layer of the material is such that the Zn content in the zinc- or zinc alloy deposited steel plate is 100 to 80% by weight while the Fe content should naturally be 100% by weight in the cold-rolled steel. Both the steels are different in the formed phosphate film. For example, in a steel plate deposited with a zinc type plating layer having a zinc content of 80 to 100% by weight, the pphosphate film is composed solely of hopeite $[Zn_3(PO_4)_2 4H_2O]$ and has a needle crystal structure. On the other hand, in case of a cold-rolled steel plate, the phosphate film is composed of hopeite and phosphophyllite $[Zn_2Fe(PO_4)_2.4H_2O]$ and when a dipping type phosphate treatment recently broadly adopted is employed, the phosphate film is composed mainly of phosphophyllite and has a columnar crystal structure.

We made research based on the foregoing facts with a view to obtaining a film having cratering resistance and water-resistant adhesion characteristics comparable to those of the cold-rolled steel plate, and we found the following facts in connection with a plating layer of an iron-zinc alloy.

Namely, in connection with the plating surface characteristics, it was found that if the Fe content exceeds the range of from 20 to 40% by weight, phosphophyllite is formed in the phosphate film and with increase of the Fe content in the plating layer, the proportion of phosphophyllite is increased. Furthermore, if the Fe content in the plating layer exceeds 50% by weight, the $\alpha$-phase (according to the X-ray diffractometry) is observed, and the $\alpha$-phase is increased with increase of the Fe content. It also was confirmed that the cratering resistance becomes substantially comparable to that of the cold-rolled steel plate if the Fe content in the Fe—Zn alloy plating layer is higher than 50% by weight, and that the water-resistant adhesion becomes substantially comparable to that of the cold-rolled steel plate if the Fe content in the Fe—Zn alloy plating layer is higher than 40% by weight.

From the foregoing results, in the present invention, an iron plating film or an iron-zinc alloy plating film having an Fe content of at least 50% by weight is selected as the topmost plating layer.

The amounts deposited of the respective plating films will now be described. The amount deposited of the iron plating film or the iron-zinc alloy plating film having an Fe content of at least 50% by weight as the topmost layer is selected within the range of 0.5 to 10 g/m$^2$, preferably 1 to 5 g/m$^2$. If the amount deposited of this topmost layer is smaller than 0.5 g/m$^2$, the characteristics of the plating film on the lower side are manifested and the cratering resistance and water-resistant adhesion are degraded. If the amount deposited of the topmost plating layer exceeds 10 g/m$^2$, the adhesion to the coating and the processability are degraded and no good results can be obtained. The amount deposited of the lower zinc or zinc alloy plating layer is selected within the range of from 1 to 60 g/m$^2$, preferably from 10 to 40 g/m$^2$. If the amount deposited of the lower plating layer is smaller than 1 g/m$^2$, the corrosion resistance is degraded and if the amount deposited of the lower plating layer exceeds 60 g/m$^2$, the processability of the plating film is degraded and the manufacturing cost is increased.

The plating methods for obtaining the foregoing plating layers are not particularly critical. For example, electric, gas phase and melting plating methods may be adopted for deposition of a zinc or iron-zinc alloy plating layer, and electric and gas phase plating methods may be adopted for deposition of a nickel-zinc or manganese-zinc alloy plating layer.

In the above-mentioned steel plate, a certain plating film is formed on each of both the surfaces. Namely, different kinds of plating films may be formed on both the surfaces or both the surfaces may be plated according to different plating methods. However, the lowermost plating layers of both the surfaces can be formed by the zinc type plating. When the process of the present invention is industrially carried out on the steel plate of this type, there is preferably adopted a method in which the same zinc alloy plating (selected from Fe—Zn alloy plating, Ni—Zn alloy plating and Mn—Zn alloy plating) is effected on both the surfaces of the starting steel plate, a plating layer of iron or an iron-zinc alloy having an Fe content of at least 50% by weight is deposited on one surface to be formed into the outer surface of a car body and on the other surface to be formed into the inner surface of a car body, a chromate film is formed as a first layer and an organic composite silicate film is formed as the second layer, and finally, the steel plate is subjected to the above-mentioned heat treatment. As pointed out hereinbefore, optional plating methods may be adopted for obtaining this steel plate. When different plating layers are formed on both the surfaces or the topmost plating layer for the outer surface is formed, the electric plating method is preferably adopted.

In the steel plate of this type, excellent coating appearance, high adhesion and high corrosion resistance of the coated surface are obtained on one surface and high corrosion resistance of the uncoated surface and high adhesion to the cationic electrodeposition coating are obtained on the other surface.

The present invention will now be described in detail with reference to the following examples that by no means limit the scope of the invention.

EXAMPLE 1

In this example, the treatment was conducted under such treatment conditions of the present present invention that a good adhesion to the cationic electrodeposition coating could be obtained.

Namely, various surface-treated steel plates differing in the plating components and the amounts pf the deposited films, as shown in Table 1, were prepared as steel plates corresponding to the inner surface of a car body according to the process of the present invention, and these surface-treated steel plates were subjected to the adhesion and corrosion resistance tests. Comparative steel plates shown in Table 2 were prepared and similarly tested.

The plating components of the respective steel plates were as described below. With respect to each of the steel plates shown in Table 1 and the steel plates having a chromate film and an organic composite silicate film, shown in Table 2, the plated steel plate was alkali-degreased, washed with water and dried, and the steel plate was coated with a coating type chromate treatment solution by a roll coater or was dipped in an electrolytic chromate treatment solution to form a chromate film. After drying, the steel plate was coated with an organic composite silicate treatment solution by a roll coater to form an organic composite silicate layer as the second layer. After drying, the steel plate was subjected to a heat treatment and was then air-cooled.

Ni—Zn alloy electric plating: Ni content of 12%
Fe—Zn alloy electric plating: Fe content of 25%
Mn—Zn alloy electric plating: Mn content of 60%
Zn—Al alloy electric plating: Al content of 5%

The coating type chromate treatment conditions, the electrolytic chromate treatment conditions and the organic composite silicate treatment solution were as described below.

Coating type chromate treatment conditions:
The $Cr^{3+}/Cr^{6+}$ ratio was 2/3, and the pH value was adjusted to 2.5 by KOH. A chromate treatment solution having a solid content of 20 g/l was coated at normal temperature by a roll coater, followed by drying.

Electrolytic chromate treatment conditions:
The $CrO_3$ concentration was 50 g/l and the $H_2SO_4$ concentration was 0.5 g/l, and the cathodic electrolytic treatment was conducted at a current density of 4.9 $A/dm^2$ in the chromate treatment solution maintained at a bath temperature of 50° C. for an electrolysis time of 2.0 seconds. The treated steel plate was washed with water and dried.

Organic composite silicate treatment solution:
An acrylic composite silicate and an epoxy composite silicate which had an organic resin/$SiO_2$ weight ratio of 20/80, 40/60, 60/40 or 80/20 were synthesized according to procedures described below, and both the composite silicates were mixed at a ratio shown in Table 1 or 2 to obtain an organic composite silicate solution having a solid content of 20%.

(A) Synthesis of acrylic composite silicate:
A 1-liter 4-neck flask equipped with a thermometer, a stirrer, a cooler and a dropping funnel was charged with 180 parts of isopropyl alcohol, and the inner atmosphere of the flaks was substituted by nitrogen and the inner temperature of the flask was adjusted to about 85° C. A monomeric mixture comprising 140 parts of ethyl acrylate, 68 parts of methyl methacrylate, 15 parts of styrene, 15 parts of N-n-butoxymethylacrylamide, 38 parts of 2-hydroxyethyl acrylate and 24 parts of acrylic acid was dropped into the flask together with a catalyst consisting of 6 parts of 2,2'-azobis(2,4-dimethylbutyronitrile) over a period of about 2 hours. After the dropwise addition, reaction was further conducted at the same temperature for 5 hours to obtain a colorless transparent resin solution having a solid content of 63% and an acid value of 67. To 500 parts of the so-obtained acrylic copolymer resin solution was added 45 parts of 38% aqueous ammonia, and water was added and the mixture was stirred sufficiently to obtain an aqueous dispersion of the acrylic copolymer having a solid content of 20% and a pH value of 9.5. The flask was charged with 300 parts of this aqueous dispersion and a prdetermined amount of colloidal silica (marketed under the tradename of "Stotex N" by Nissan Kagaku Kogyo K.K.) was added to the dispersion at room temperature with sufficient stirring. Then, 1 part of γ-methacryloxypropyltrimethoxysilane (marketed under the tradename of "KBM 503" by Shinetsu Kagaku Kogyo K.K.) was dropped to the mixture with stirring. Then, the mixture was heated at 85° C. and maintained at this temperature for 2 hours to effect reaction and obtain a milky white water-dispersible acrylic composite silicate.

(B) Synthesis of epoxy composite silicate:
A flask was charged with 310 parts of a bisphenol A type epoxy resin having an epoxy equivalent of 950 (marketed under the tradename of "Epikote 1004" by Shell Kagaku K.K.), 95 parts of linseed fatty acid, 95 parts of tung oil fatty acid and 15 parts of xylene, and the mixture was gradually heated under a nitrogen current until the temperature was elevated to 240° C. Then, the mixture was cooled, and when the temperature was lowered to 70° C., 200 parts of ethylene glycol monoethyl ether was added to the reaction mixture to obtain an oil-modified epoxy resin solution having a solid content of 70% and an acid value of 54. An epoxy composite silicate was prepared from this oil-modified epoxy resin solution in the same manner as described in (A) above.

Each of sample steel plates including comparative samples was coated with a rust-preventive oil (Diamond PA920 supplied by Mitsubish Sekiyu K.K.), allowed to stand still for one day and subjected to a phosphate treatment under a standard condition for Boderite 3004 (supplied by Nippon Parkerizing K.K.). Then, the corrosion resistance test was carried out according to the following procedures.

Namely, the cycle test was conducted by performing the following operations as one cycle:

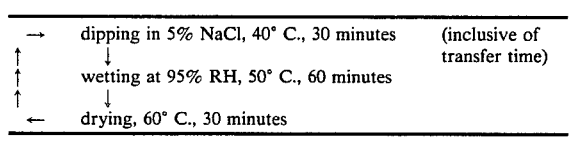

At 250, 500 and 1000 cycles, the area where red rusting occurred was measured with respect to each sample.

The adhesion test was carried out according to the following procedures.

Each sample that had been subjected to the phosphate treatment was subjected to electrodeposition using a cationic electrodeposition paint (U-50 supplied by Nippon Paint K.K.) to form a coating film having a thickness of 20μ, and the primary and secondary adhesion tests were carried out. At the primary adhesion test, 100 cross cuts were formed at intervals of 1 mm on the coated surface of each sample, and an adhesive tape was applied to the cross cuts and peeled. At the secondary adhesion test, after the electrodeposition, each sample was dipped in warm water (pure water) maintained at 40° C. for 120 hours, and within 30 minutes, cross cuts were formed at intervals of 1 mm in the same manner as described above and an adhesive tape was applied to the cross cuts and peeled.

The results of the above-mentioned corrosion resistance and adhesion tests are shown in Tables 3 and 4. As is apparent from the results shown in these Tables, the samples of the present invention are excellent over the comparative samples in that the samples of the present invention have a high corrosion resistance and a good adhesion to the cationic electrodeposition coating in combination. In Tables 2 and 4, comparative samples Nos. 1 and 2 were given to show the criticality of the proportion of the epoxy resin to the total solids in the organic composite silicate film, comparative samples Nos. 3 and 4 were given to show the criticality of the amount deposited of the organic composite silicate film, and comparative samples Nos. 5 and 6 were given to show the influences of the heat treatment. From the results obtained with respect to these comparative samples, it is seen that if the requirements specified in the present invention are not satisfied, obtained steel plates are insufficient in at least one of corrosion resistance, adhesion, spot weldability and processability (peeling at the pressing step) and are not suitable as rust-proof steel plates for a car body. It will also be understood that in the samples of the present invention, the larger is the proportion of the epoxy resin in the organic composite silicate, the more improved is the adhesion to the cationic electrodeposition coatings.

EXAMPLE 2

In this example, the treatments were carried out under severer conditions so that a good adhesion to a multiple coating including at least two coating layers. Namely, a treatment was carried out with an organic composite silicate solutiob in which the content of the epoxy resin was at least 26% by weight based on the total solids and the $SiO_2$/organic resin weight ratio was from 10/90 to 60/40, and a heat treatment was carried out at a temperature of at least 250° C. Surface-treated steel plates having plating components and deposition amounts shown in Tables 5-a through 5-d were prepared as steel plates corresponding to the inner surface of a carbody, and the adhesions to two-layer and three-layer coatings and the corrosion resistance after the coating were tested. For comparison, steel plates shown in Tables 6-a and 6-b were prepared, and they were similarly tested. In Table 6-a, samples Nos. 1, 2, 4, 5, 6, 8, 9, 11 and 13 are included within the scope of the present invention, but the content of the epoxy resin was lower than 26% by weight or the heat treatment temperature was lower than 250° C. Accordingly, in this example, these samples were designated as comparative samples.

The plating components, chromate treatment conditions and organic composite silicate treatment conditions were the same as in Example 1.

The adhesion test was carried out according to the following procedures.

In case of the two-layer coating, a sample that had been subjected to the phosphate treatment was subjected to electrodeposition with a cationic electrodeposition pain (U-50 supplied by Nippon Paint K.K.) to form a coating film having a thickness of 20μ, and then, the sample was spray-coated with Amilac No. 002 (supplied by Kansai Paint K.K.) in a thickness of 30μ. In case of the three-layer coating, after the electrodeposition coatiing, a sample was spray-coated with Orga S89 and Orga S50 (supplied by Nippon Paint K.K.) in thicknesses of 20μ and 25μ, respectively, and the sample was spray-coated with Amilac No. 805 White (supplied by Kansai Paint K.K.) in a thickness of 40μ. Each sample was subjected to the primary adhesion test and secondary adhesion test. At the primary adhesion test, 100 cross cuts were formed on the coated surface of each sample at intervals of 1 mm in case of the two-layer coating or 2 mm in case of the three-layer coating, and an adhesive tape was applied to the cross cuts and peeled. At the secondary adhesion test, after the coating operation, each sample was dipped in warm water (pure water) maintained at 40° C. for 120 hours, and within 30 minutes, cross cuts were formed in the same manner as described above at intervals of 1 mm in case of the two-layer coating or 2 mm in case of the three-layer coating. An adhesive tape was applied to cross cuts and peeled.

The corrosion resistance was determined according to the cycle test conducted by performing the following operations as one cycle:

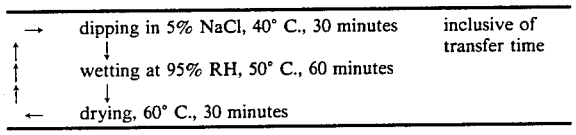

At 500 and 1000 cycles, the degree of rusting was checked with respect to each sample.

The results of the adhesion test and corrosion resistance test are shown in Tables 7a through 7-d and 8-a through 8-b. From these results, it will readily be understood that if there is adopted the preferred embodiment of the present invention where the epoxy resin content in the organic composite silicate is at least 26% by weight, the $SiO_2$/organic resin weight ratio is adjusted to from 10/90 to 60/40 and the heat treatment is carried out at a higher temperature of at least 250°, there can be obtained a surface-treated steel plate which is excellent in the corrosion resistance and the adhesion to a multiple coating including at least 2 coating layers over not only the conventional coated steel plates but also steel plates prepared according to other embodiments of the present invention.

The terminology of "organic composite silicate film" referred to in the foregoing explanation of the invention is defined as—composite silicate resin film formed on the chromate film and consisting essentially of a colloidal silica, an organic resin and a silane compound.

TABLE 1

| | | Samples of the invention | | | | | | |
|---|---|---|---|---|---|---|---|---|
| | | Chromate Film | | Composite silicate resin film | | | | |
| No. | Substrates | A | B | C | D | E | F (*1) | G |
| 1. | Ni—Zn alloy plating (20 g/m²) | H | 40 | 80 | 0/100 | 2.3 | 19 | 160 |
| 2. | " | " | " | 60 | 50/50 | " | " | " |
| 3. | " | " | " | " | 0/100 | " | 38 | " |

TABLE 1-continued

Samples of the invention

| No. | Substrates | Chromate Film A | Chromate Film B | Composite silicate resin film C | D | E | F (*1) | G |
|---|---|---|---|---|---|---|---|---|
| 4. | " | " | " | 40 | 50/50 | " | 29 | " |
| 5. | " | " | " | " | 30/70 | " | 40 | " |
| 6. | " | " | " | " | 0/100 | " | 57 | " |
| 7. | " | " | " | 20 | 80/20 | " | 15 | " |
| 8. | " | " | " | " | 50/50 | " | 38 | " |
| 9. | " | " | " | " | 0/100 | " | 76 | " |
| 10. | " | " | " | 40 | 30/70 | " | 40 | 110 |
| 11. | " | " | " | " | " | " | " | 200 |
| 12. | " | " | " | " | " | " | " | 240 |
| 13. | " | " | " | " | " | 1.0 | " | 160 |
| 14. | " | " | " | " | " | 1.8 | " | " |
| 15. | " | " | " | " | " | 3.0 | " | " |
| 16. | " | " | 10 | " | " | 2.3 | " | " |
| 17. | " | " | 150 | " | " | " | " | " |
| 18. | " | " | 40 | " | 50/50 | 0.6 | 29 | " |
| 19. | " | " | " | " | " | 3.5 | " | " |
| 20. | " | " | " | " | " | 2.3 | " | 280 |
| 21. | Ni—Zn alloy plating (5 g/m²) | " | " | " | 30/70 | " | 40 | 160 |
| 22. | Ni—Zn alloy plating (10 g/m²) | " | " | " | " | " | " | " |
| 23. | Ni—Zn alloy plating (30 g/m²) | " | " | " | " | " | " | " |
| 24. | Ni—Zn alloy plating (40 g/m²) | " | " | " | " | " | " | " |
| 25. | Ni—Zn alloy plating (20 g/m²) | " | " | " | " | 2.3 (2*) | 25 | " |
| 26. | Ni—Zn alloy plating (20 g/m²) | I | 40 | 40 | 30/70 | 2.3 | 25 | 160 |
| 27. | Fe—Zn alloy plating (30 g/m²) | H | 80 | " | " | " | " | " |
| 28. | " | " | " | " | " | 2.3 (2*) | " | " |
| 29. | Mn—Zn alloy plating (20 g/m²) | " | 30 | " | " | " | 40 | " |
| 30. | Zn—Al alloy plating (90 g/m²) | " | 50 | " | " | " | " | " |

Note
A: Chromate treatment,
B: Amount (mg/m²) deposited chromium,
C: Amount (wt %) of silica sol in film,
D: Acrylic/epoxy solid ratio,
E: Amount (mg/m²) deposited of film,
F: Ratio (wt %) of epoxy resin to total solid,
G: Baking temperature (°C.),
H: Coating type,
I: Electrolytic type
(*1): Calculated while 0.5% by weight of silane compound taken into consideration
(*2): Ammonium meta vanadate was added as additive to organic composite silicate solution in amount of 5 g per 100 g of total solids of silica sol and organic resin

TABLE 2

Comparative samples

| No. | Substrates | Chromate Film A | Chromate Film B | Composite silica resin film C | D | E | F | G |
|---|---|---|---|---|---|---|---|---|
| 1. | Ni—Zn alloy plating (20 g/m²) | H | 40 | 80 | 50/50 | 2.3 | 9.5 | 150 |
| 2. | " | " | " | 40 | 80/20 | " | 11 | " |
| 3. | " | " | " | " | 30/70 | 0.3 | 40 | 160 |
| 4. | " | " | " | " | " | 5.0 | " | " |
| 5. | " | " | " | " | " | 2.3 | " | 80 |
| 6. | " | " | " | " | " | " | " | 35 |
| 7. | " | " | " | — | — | — | — | 160 |
| 8. | " | — | — | 40 | 30/70 | 2.3 | 40 | " |
| 9. | " | — | — | — | — | — | — | — |
| 10. | Fe—Zn alloy plating (30 g/m²) | H | 80 | — | — | — | — | 160 |
| 11. | " | — | — | 40 | 30/70 | 2.3 | 40 | " |
| 12. | " | — | — | — | — | — | — | — |
| 13. | Mn—Zn alloy plating (20 g/m²) | H | 30 | — | — | — | — | 160 |
| 14. | " | — | — | 40 | 30/70 | 2.3 | 40 | " |
| 15. | " | — | — | — | — | — | — | — |
| 16. | Zn—Al alloy plating (90 g/m²) | H | 50 | — | — | — | — | 160 |
| 17. | " | — | — | 40 | 30/70 | 2.3 | 40 | " |
| 18. | " | — | — | — | — | — | — | — |
| 19. | Zinchrometal (*1) | — | — | — | — | — | — | — |

Note
A through H: Same as in Table 1
(*1): Cold rolled steel sheet was coated with dachromet (300 mg/m² as chromium) as first layer, heated at 170° C., coated with zinchromet (12μ in thickness) as second layer and baked at 270° C.

TABLE 3

Samples of the invention

| No. | ED Adhesion Primary adhesion | ED Adhesion Secondary adhesion | Uncoated corrosion resistance 250-cycle test | Uncoated corrosion resistance 500-cycle test | Uncoated corrosion resistance 1000-cycle test |
|---|---|---|---|---|---|
| 1. | ○ | ○ | ○ | △ | X |
| 2. | ○ | ○ | ○ | △ | △ |
| 3. | ◉ | ◉ | ○ | △ | △ |
| 4. | ○-◉ | ○-◉ | ◉ | ◉ | ○ |
| 5. | ◉ | ◉ | ◉ | ◉ | ○ |
| 6. | ◉ | ◉ | ○-◉ | ○ | △ |
| 7. | ○ | ○ | ◉ | △ | △ |
| 8. | ◉ | ◉ | ◉ | △ | △ |
| 9. | ◉ | ◉ | ◉ | △ | △-X |
| 10. | ◉ | ◉ | ◉ | ◉ | ○ |
| 11. | ◉ | ◉ | ◉ | ◉ | ○ |
| 12. | ◉ | ◉ | ◉ | ○ | △ |
| 13. | ◉ | ◉ | ◉ | ○ | △ |
| 14. | ◉ | ◉ | ◉ | ◉ | ○ |
| 15. | ◉ | ◉ | ◉ | ◉ | ◉ |
| 16. | ◉ | ◉ | ◉ | ○ | △ |
| 17. | ◉ | ◉ | ◉ | ◉ | ○ |
| 18. | ◉ | ◉ | ◉ | ○ | △ |
| 19. | ◉ | ◉ | ◉ | ◉ | ◉ |
| 20. | ◉ | ◉ | ◉ | ○ | △ |
| 21. | ◉ | ◉ | ○ | △ | X |
| 22. | ◉ | ◉ | ◉ | ○ | △ |
| 23. | ◉ | ◉ | ◉ | ◉ | ○-◉ |
| 24. | ◉ | ◉ | ◉ | ◉ | ◉ |
| 25. | ◉ | ○-◉ | ◉ | ◉ | ◉ |
| 26. | ◉ | ◉ | ◉ | ○ | X |
| 27. | ◉ | ◉ | ◉ | △-◉ | X |
| 28. | ◉ | ○-◉ | ◉ | ○-◉ | △ |
| 29. | ◉ | ◉ | ◉ | ◉ | ◉ |
| 30. | ◉ | ◉ | ◉ | ◉ | ◉ |

Note
Standard of evaluation of corrosion resistance
Double circle — 0–2% of red rust-occuring area
Single circle — 3–10% of red rust-occuring area
Triangle — 11–50% of red rust-occuring area
Cross — 51–100% of red rust-occuring area
Standard of evaluation of adhesion
Double circle — No change
Single circle — Slight peeling of coating
Triangle — Some peeling of coating
Cross — Considerable peeling of coating

TABLE 4

Comparative samples

| No. | Adhesion Primary adhesion | Adhesion Secondary adhesion | Uncoated corrosion resistance 250-cycle test | Uncoated corrosion resistance 500-cycle test | Uncoated corrosion resistance 1000-cycle test |
|---|---|---|---|---|---|
| 1. | X | X | ○ | △ | X |
| 2. | △ | X | ◉ | ○ | △ |
| 3. | ◉ | ◉ | △ | X | — |
| 4. | ◉ | ◉ | ◉ | ◉ | ◉ |
| 5. | X | X | △ | X | — |
| 6. | X | X | X | X | — |
| 7. | ◉ | ◉ | X-△ | X | — |
| 8. | ◉ | ◉ | △ | X | — |
| 9. | ○ | X | X-△ | X | — |
| 10. | ◉ | ○ | X | — | — |
| 11. | ◉ | ◉ | ○ | X | — |
| 12. | ○ | X | X | — | — |
| 13. | ◉ | ◉ | △ | X | — |
| 14. | ◉ | ◉ | △ | X | — |
| 15. | ○ | X | △ | X | — |
| 16. | ◉ | ◉ | △ | △ | X |
| 17. | ◉ | ◉ | △ | △ | X |
| 18. | ○ | X | △ | △ | X |
| 19. | ◉ | ◉ | △ | X | — |

Note
Standard of evaluation of corrosion resistance
Double circle — 0–2% of red rust-occuring area
Single circle — 3–10% of red rust-occuring area
Triangle — 11–50% of red rust-occuring area
Cross — 51–100% of red rust-occuring area
Standard of evaluation of adhesion
Double circle — No change
Single circle — Slight peeling coating
Triangle — Some peeling of coating
Cross — Considerable peeling of coating

TABLE 5

Sample of the invention

| No. | Substrate Kind of plating | Chromate film J | Composite silicate resin film A | B | C | D | E | F (*1) | K (*2) | G |
|---|---|---|---|---|---|---|---|---|---|---|
| 1. | Ni—Zn alloy plating | 20 | H | 40 | 60 | 30/70 | 2.3 | 27.9 | 0 | 260 |
| 2. | " | " | " | " | " | 0/100 | " | 39.8 | " | " |
| 3. | " | " | " | " | 40 | 50/50 | " | 29.9 | " | " |
| 4. | " | " | " | " | " | 30/70 | " | 41.8 | " | " |
| 5. | " | " | " | " | " | 0/100 | " | 59.7 | " | " |
| 6. | " | " | " | " | 20 | 60/40 | " | 30.4 | " | " |
| 7. | " | " | " | " | " | 30/70 | " | 55.7 | " | " |
| 8. | " | " | " | " | " | 0/100 | " | 79.6 | " | " |
| 9. | " | " | " | " | 40 | 0/100 | " | 59.7 | " | 255 |
| 10. | " | " | " | " | " | " | " | " | " | 275 |
| 11. | " | " | " | " | " | " | " | " | " | 300 |
| 12. | " | " | " | " | " | 50/50 | " | 29.9 | " | 255 |
| 13. | " | " | " | " | " | " | " | " | " | 275 |
| 14. | " | " | " | " | " | " | " | " | " | 300 |
| 15. | " | " | " | " | " | 0/100 | 1.0 | 59.7 | " | 260 |
| 16. | " | " | " | " | " | " | 1.8 | " | " | " |
| 17. | " | " | " | " | " | " | 3.0 | " | " | " |
| 18. | " | " | " | " | 20 | " | 2.3 | " | " | " |
| 19. | " | " | " | 150 | " | " | " | " | " | " |
| 20. | " | 5 | " | 40 | " | 30/70 | " | 41.8 | " | " |
| 21. | " | 10 | " | " | " | " | " | " | " | " |
| 22. | " | 30 | " | " | " | " | " | " | " | " |
| 23. | " | 40 | " | " | " | " | " | " | " | " |
| 24. | " | 20 | I | " | " | " | " | " | " | " |
| 25. | Fe—Zn alloy plating | 30 | " | 100 | " | " | " | " | " | " |
| 26. | " | " | " | " | " | " | " | 41.8 (*4) | " | " |
| 27. | Mn—Zn alloy plating | 90 | " | 30 | " | " | " | " | " | " |
| 28. | Zn—A alloy plating | " | " | 50 | " | " | " | " | " | " |
| 29. | Al plating | " | " | " | " | " | " | " | " | " |

TABLE 5-continued

| | | | Sample of the invention | | | | | | | |
|---|---|---|---|---|---|---|---|---|---|---|
| | Substrate | | Chromate film | | Composite silicate resin film | | | | | |
| No. | Kind of plating | J | A | B | C | D | E | F (*1) | K (*2) | G |
| 30. | Ni—Zn alloy plating | 20 | " | 40 | " | 0/100 | " | 59.7 | 0.1 | " |
| 31. | " | " | " | " | " | " | " | " | 0.5 | " |
| 32. | " | " | " | " | " | " | " | " | 1 | " |
| 33. | " | " | " | " | " | " | " | " | 3 | " |
| 34. | " | " | " | " | " | " | " | " | 10 | " |
| 35. | " | " | " | " | " | " | " | " | 50 | " |
| 36. | " | " | " | " | " | " | " | " | 100 | " |
| 37. | " | " | " | " | " | 50/50 | " | 29.9 | 0.1 | " |
| 38. | " | " | " | " | " | " | " | " | 0.5 | " |
| 39. | " | " | " | " | " | " | " | " | 1 | " |
| 40. | " | " | " | " | " | " | " | " | 3 | " |
| 41. | " | " | " | " | " | " | " | " | 10 | " |
| 42. | " | " | " | " | " | " | " | " | 50 | " |
| 43. | " | " | " | " | " | " | " | " | 100 | " |
| 44. | " | " | " | " | " | " | " | " | 3 | 255 |
| 45. | " | " | " | " | " | " | " | " | " | 275 |
| 46. | " | " | " | " | " | " | " | " | " | 300 |
| 47. | " | " | " | " | " | " | " | " | " | 325 |
| 48. | " | " | " | " | " | " | " | " | " | 350 |
| 49. | " | " | " | " | " | 0/100 | " | 59.7 | " | 255 |
| 50. | " | " | " | " | " | " | " | " | " | 275 |
| 51. | " | " | " | " | " | " | " | " | " | 300 |
| 52. | " | " | " | " | " | " | " | " | " | 325 |
| 53. | " | " | " | " | " | " | " | " | " | 350 |
| 54. | " | " | " | " | " | " | 1.0 | " | " | 260 |
| 55. | " | " | " | " | " | " | 1.8 | " | " | " |
| 56. | " | " | " | " | " | " | 3.0 | " | " | " |
| 57. | " | " | " | 20 | " | 30/70 | 2.3 | 41.8 | " | " |
| 58. | " | " | " | 150 | " | " | " | " | " | " |
| 59. | " | 5 | " | 40 | " | " | " | " | " | " |
| 60. | " | 10 | " | " | " | " | " | " | " | " |
| 61. | " | 30 | " | " | " | " | " | " | " | " |
| 62. | " | 40 | " | " | " | " | " | " | " | " |
| 63. | " | 20 | " | " | " | " | 2.3 (*4) | " | " | " |
| 64. | " | " | " | 43 | " | " | 2.3 | " | " | " |
| 65. | Fe—Zn alloy plating | 30 | " | 100 | " | " | " | " | " | " |
| 66. | " | " | " | " | " | " | 2.3 (*4) | " | " | " |
| 67. | Mn—Zn alloy plating | 20 | " | 30 | " | " | " | " | " | " |
| 68. | Zn—A alloy plating | 90 | " | 50 | " | " | " | " | " | " |
| 69. | Al plating | " | " | " | " | " | " | " | " | " |

Note
A through I: Same as in Table 1,
J: Deposited amount (g/m²),
K: below to [°]
(*1): Calculated while taking 0.5% by weight of silane compound into consideration
(*2): Parts by weight per 100 parts by weight of epoxy resin
(*3): Corresponding to ratio of SiO₂ to resin and SiO₂ in solution
(*4): Ammonium vanadate was added as additives to composite silicate resin solution in amount of 5 g per 100 g of total solids
[°] K: Amount (parts) of melamine as curing agent

TABLE 6

| | | | | | Comparative samples | | | | | |
|---|---|---|---|---|---|---|---|---|---|---|
| | Substrate | | Chromate film | | Composite silicate resin film | | | | | |
| No. | Kind of plating | J | A | B | C (*3) | D | E | F (*1) | K (*2) | G |
| 1. | Ni—Zn alloy plating | 20 | H | 40 | 80 | 0/100 | 2.3 | 19.9 | 0 | 260 |
| 2. | " | " | " | " | 60 | 50/50 | " | 17.9 | " | " |
| 3. | " | " | " | " | 40 | 80/20 | " | 11.9 | " | " |
| 4. | " | " | " | " | 20 | " | " | 19.9 | " | " |
| 5. | " | " | " | " | 40 | 0/100 | " | 59.7 | " | 190 |
| 6. | " | " | " | " | " | " | " | " | " | 225 |
| 7. | " | " | " | " | " | " | " | " | " | 325 |
| 8. | " | " | " | " | " | 50/50 | " | 29.9 | " | 190 |
| 9. | " | " | " | " | " | " | " | " | " | 225 |
| 10. | " | " | " | " | " | " | " | " | " | 325 |
| 11. | " | " | " | " | " | 0/100 | " | 59.7 | 3 | 225 |
| 12. | " | " | " | " | " | " | " | " | " | 375 |
| 13. | " | " | " | " | " | 50/50 | " | 29.9 | " | 225 |
| 14. | " | " | " | " | " | " | " | " | " | 375 |
| 15. | " | " | " | " | " | 0/100 | 0.3 | 59.7 | 0 | 260 |
| 16. | " | " | " | " | " | " | 5.0 | " | " | " |
| 17. | " | " | " | " | " | " | 0.3 | " | 3 | " |
| 18. | " | " | " | " | " | " | 5.0 | " | " | " |
| 19. | " | " | " | " | — | — | — | — | — | " |
| 20. | " | " | " | — | — | — | — | — | — | — |

TABLE 6-continued

| | | Comparative samples | | | | | | | | |
|---|---|---|---|---|---|---|---|---|---|---|
| | Substrate | | Chromate film | | Composite silicate resin film | | | | | |
| No. | Kind of plating | J | A | B | C (*3) | D | E | F (*1) | K (*2) | G |
| 21. | Fe—Zn alloy plating | 30 | H | 80 | — | — | — | — | — | 260 |
| 22. | " | " | — | — | — | — | — | — | — | — |
| 23. | Mn—Zn alloy plating | 20 | H | 30 | — | — | — | — | — | 260 |
| 24. | " | " | — | — | — | — | — | — | — | — |
| 25. | Zn—A alloy plating | 90 | H | 50 | — | — | — | — | — | 260 |
| 26. | " | " | — | — | — | — | — | — | — | — |
| 27. | Al plating | " | H | 50 | — | — | — | — | — | 260 |
| 28. | " | " | — | — | — | — | — | — | — | — |
| 29. | Zinchrometal | Cold-rolled steel sheet was coated with dachromet (300 g/m² as Cr) as a first layer, heated at 170° C., coated with zinchrot (12μ in thickness) as a second layer and baked at 270° C. | | | | | | | | |

Note
A through K: Same as in Table 5
(*1): Calculated while taking 0.5% by weight of silane compound into consideration but not taking amount of curing agent into consideration
(*2): Parts by weight per 100 parts by weight of epoxy resin
(*3): Corresponding to ratio of SiO₂ to resin and SiO₂ in solution

TABLE 7

| | Samples of the invention | | | | | | | |
|---|---|---|---|---|---|---|---|---|
| | Adhesion of 2-layer coating | | Adhesion to 3-layer coating | | Corrosion resistance after 2-layer coating | | Corrosion resistance after 3-layer coating | |
| No. | Primary adhesion | Secondary adhesion | Primary adhesion | Secondary adhesion | 500 cycles | 1000 cycles | 500 cycles | 1000 cycles |
| 1. | ○ | ○ | △-X | X | ⊙ | ⊙ | ⊙ | ⊙ |
| 2. | ⊙-○ | ○-⊙ | △ | △-X | ⊙ | ⊙ | ⊙ | ⊙ |
| 3. | ○ | ○ | △ | △-X | ⊙ | ⊙ | ⊙ | ⊙ |
| 4. | ⊙-○ | ○-⊙ | △ | △-X | ⊙ | ⊙ | ⊙ | ⊙ |
| 5. | ⊙-○ | ⊙-○ | △ | △-X | ⊙ | ⊙ | ⊙ | ⊙ |
| 6. | ○ | ○ | △-X | X | ⊙ | ⊙ | ⊙ | ⊙ |
| 7. | ⊙-○ | ⊙-○ | △ | △-X | ⊙ | ⊙ | ⊙ | ⊙ |
| 8. | ⊙-○ | ⊙-○ | △ | △-X | ⊙ | ⊙ | ⊙ | ⊙ |
| 9. | ⊙-○ | ⊙-○ | △ | △-X | ⊙ | ⊙ | ⊙ | ⊙ |
| 10. | ⊙-○ | ⊙-○ | △ | △-X | ⊙ | ⊙ | ⊙ | ⊙ |
| 11. | ⊙-○ | ⊙-○ | △ | △-X | ⊙ | ⊙ | ⊙ | ⊙ |
| 12. | ○ | ○ | △ | △-X | ⊙ | ⊙ | ⊙ | ⊙ |
| 13. | ○ | ○ | △ | △-X | ⊙ | ⊙ | ⊙ | ⊙ |
| 14. | ○ | ○ | △ | X | ⊙ | ⊙ | ⊙ | ⊙ |
| 15. | ⊙-○ | ⊙-○ | △ | △-X | ⊙ | ○ | ⊙ | ○ |
| 16. | ⊙-○ | ⊙-○ | △ | △-X | ⊙ | ⊙ | ⊙ | ⊙ |
| 17. | ⊙-○ | ⊙-○ | △ | △-X | ⊙ | ⊙ | ⊙ | ⊙ |
| 18. | ⊙-○ | ⊙-○ | △ | △-X | ⊙ | ⊙ | ⊙ | ⊙ |
| 19. | ⊙-○ | ⊙-○ | △ | △-X | ⊙ | ⊙ | ⊙ | ⊙ |
| 20. | ⊙-○ | ⊙-○ | △ | △-X | ○ | ○ | ○ | ○ |
| 21. | ⊙-○ | ⊙-○ | △ | △-X | ⊙ | ⊙ | ⊙ | ⊙ |
| 22. | ⊙-○ | ⊙-○ | △ | △-X | ⊙ | ⊙ | ⊙ | ⊙ |
| 23. | ⊙-○ | ⊙-○ | △ | △-X | ⊙ | ⊙ | ⊙ | ○ |
| 24. | ⊙-○ | ⊙-○ | △ | △-X | ⊙ | ○ | ⊙ | ○ |
| 25. | ⊙-○ | ⊙-○ | △ | △-X | ⊙ | ○ | ⊙ | ○ |
| 26. | ⊙-○ | ⊙-○ | △ | △-X | ⊙ | ○ | ⊙ | ○ |
| 27. | ⊙-○ | ⊙-○ | △ | △-X | ⊙ | ⊙ | ⊙ | ⊙ |
| 28. | ⊙-○ | ⊙-○ | △ | △-X | ⊙ | ⊙ | ⊙ | ⊙ |
| 29. | ⊙-○ | ⊙-○ | △ | △-X | ⊙ | ⊙ | ⊙ | ⊙ |
| 30. | ⊙ | ⊙ | ⊙ | ○ | ⊙ | ⊙ | ⊙ | ⊙ |
| 31. | ⊙ | ⊙ | ⊙ | ○-⊙ | ⊙ | ⊙ | ⊙ | ⊙ |
| 32. | ⊙ | ⊙ | ⊙ | ⊙ | ⊙ | ⊙ | ⊙ | ⊙ |
| 33. | ⊙ | ⊙ | ⊙ | ⊙ | ⊙ | ⊙ | ⊙ | ⊙ |
| 34. | ⊙ | ⊙ | ⊙ | ⊙ | ⊙ | ⊙ | ⊙ | ⊙ |
| 35. | ⊙ | ⊙ | ⊙ | ⊙ | ⊙ | ⊙ | ⊙ | ⊙ |
| 36. | ⊙ | ⊙ | ⊙ | ⊙ | ⊙ | ⊙ | ⊙ | ⊙ |
| 37. | ⊙ | ⊙ | ○-⊙ | ○-⊙ | ⊙ | ⊙ | ⊙ | ⊙ |
| 38. | ⊙ | ⊙ | ○-⊙ | ○ | ⊙ | ⊙ | ⊙ | ⊙ |
| 39. | ⊙ | ⊙ | ○-○ | ○-⊙ | ⊙ | ⊙ | ⊙ | ⊙ |
| 40. | ⊙ | ⊙ | ○-⊙ | ○-⊙ | ⊙ | ⊙ | ⊙ | ⊙ |
| 41. | ⊙ | ⊙ | ○-⊙ | ○-⊙ | ⊙ | ⊙ | ⊙ | ⊙ |
| 42. | ⊙ | ⊙ | ○-⊙ | ○-⊙ | ⊙ | ⊙ | ⊙ | ⊙ |
| 43. | ⊙ | ⊙ | ○-⊙ | ○-⊙ | ⊙ | ⊙ | ⊙ | ⊙ |
| 44. | ○-⊙ | ○-⊙ | ○ | ○ | ⊙ | ⊙ | ⊙ | ⊙ |
| 45. | ⊙ | ⊙ | ○-⊙ | ○-⊙ | ⊙ | ⊙ | ⊙ | ⊙ |
| 46. | ⊙ | ⊙ | ○-⊙ | ○-⊙ | ⊙ | ⊙ | ⊙ | ⊙ |
| 47. | ⊙ | ⊙ | ○-⊙ | ○ | ⊙ | ⊙ | ⊙ | ⊙ |
| 48. | ⊙ | ○-⊙ | ○-⊙ | ○ | ⊙ | ⊙ | ⊙ | ⊙ |
| 49. | ⊙ | ⊙ | ⊙ | ○-⊙ | ⊙ | ⊙ | ⊙ | ⊙ |
| 50. | ⊙ | ⊙ | ⊙ | ⊙ | ⊙ | ⊙ | ⊙ | ⊙ |

TABLE 7-continued

| | Samples of the invention | | | | | | | |
|---|---|---|---|---|---|---|---|---|
| | Adhesion of 2-layer coating | | Adhesion to 3-layer coating | | Corrosion resistance after 2-layer coating | | Corrosion resistance after 3-layer coating | |
| No. | Primary adhesion | Secondary adhesion | Primary adhesion | Secondary adhesion | 500 cycles | 1000 cycles | 500 cycles | 1000 cycles |
| 51. | ⊚ | ⊚ | ⊚ | ⊚ | ⊚ | ⊚ | ⊚ | ⊚ |
| 52. | ⊚ | ⊚ | ⊚ | ⊚ | ⊚ | ⊚ | ⊚ | ⊚ |
| 53. | ⊚ | ⊚ | ⊚ | ⊚ | ⊚ | ⊚ | ⊚ | ⊚ |
| 54. | ⊚ | ⊚ | ⊚ | ⊚ | ○ | ○ | ⊚ | ○ |
| 55. | ⊚ | ⊚ | ⊚ | ⊚ | ⊚ | ⊚ | ⊚ | ⊚ |
| 56. | ⊚ | ⊚ | ⊚ | ⊚ | ⊚ | ⊚ | ⊚ | ⊚ |
| 57. | ⊚ | ⊚ | ⊚ | ⊚ | ⊚ | ⊚ | ⊚ | ⊚ |
| 58. | ⊚ | ⊚ | ⊚ | ⊚ | ⊚ | ⊚ | ⊚ | ⊚ |
| 59. | ⊚ | ⊚ | ⊚ | ⊚ | ○ | ○ | ○ | ○ |
| 60. | ⊚ | ⊚ | ⊚ | ⊚ | ⊚ | ⊚ | ○ | ○ |
| 61. | ⊚ | ⊚ | ⊚ | ⊚ | ⊚ | ⊚ | ⊚ | ⊚ |
| 62. | ⊚ | ⊚ | ⊚ | ⊚ | ⊚ | ⊚ | ⊚ | ⊚ |
| 63. | ⊚ | ⊚ | ⊚ | ⊚ | ⊚ | ⊚ | ⊚ | ⊚ |
| 64. | ⊚ | ⊚ | ⊚ | ⊚ | ⊚ | ○ | ⊚ | ○ |
| 65. | ⊚ | ⊚ | ⊚ | ⊚ | ⊚ | ○ | ⊚ | ○ |
| 66. | ⊚ | ⊚ | ⊚ | ⊚ | ⊚ | ○ | ⊚ | ○ |
| 67. | ⊚ | ⊚ | ⊚ | ⊚ | ⊚ | ○ | ⊚ | ⊚ |
| 68. | ⊚ | ⊚ | ⊚ | ⊚ | ⊚ | ⊚ | ⊚ | ⊚ |
| 69. | ⊚ | ⊚ | ⊚ | ⊚ | ⊚ | ⊚ | ⊚ | ⊚ |

Note
Standard of evaluation of corrosion resistance
Double circle — Small white rust in cut portion
Single circle — Large white rust in cut portion
Triangle — Small red rust in cut portion
Cross — Large red rust in cut portion
Standard of evaluation of adhesion
Double circle — No change
Single circle — Slight peeling of coating
Triangle — Some peeling of coating
Cross — Considerable peeling of coating
Standards of evaluation of the corrosion resistance and adhesion are the same as in Table 3.

TABLE 8

| | Comparative samples | | | | | | | |
|---|---|---|---|---|---|---|---|---|
| | Adhesion to 2-layer coating | | Adhesion to 3-layer coating | | Corrosion resistance after 2-layer coating | | Corrosion resistnce after 3-layer coating | |
| No. | Primary adhesion | Secondary adhesion | Primary adhesion | Secondary adhesion | 500 cycles | 1000 cycles | 500 cycles | 1000 cycles |
| 1. | △ | △–× | × | × | | | | |
| 2. | △ | △–× | × | × | | | | |
| 3. | △ | × | × | × | | | | |
| 4. | △ | △–× | × | × | | | | |
| 5. | △ | △–× | × | × | | | | |
| 6. | △ | △ | × | × | | | | |
| 7. | △ | × | × | × | | | | |
| 8. | × | × | × | × | | | | |
| 9. | △ | ×–△ | × | × | | | | |
| 10. | △ | × | × | × | | | | |
| 11. | △ | △ | △ | △ | | | | |
| 12. | △ | △ | △ | △ | | | | |
| 13. | △ | △ | △ | △–× | | | | |
| 14. | △ | △ | △ | △–× | | | | |
| 15. | ⊚–○ | ⊚–○ | △ | △–× | △ | △ | △ | △ |
| 16. | ⊚–○ | ⊚–○ | △ | △–× | ⊚ | ⊚ | ⊚ | ⊚ |
| 17. | ⊚ | ⊚ | ⊚ | ⊚ | △ | △ | △ | △ |
| 18. | ⊚ | ⊚ | ⊚ | ⊚ | ⊚ | ⊚ | ⊚ | ⊚ |
| 19. | ⊚–○ | ⊚–○ | △ | △–× | △ | × | △ | × |
| 20. | △ | × | × | × | × | × | × | × |
| 21. | ⊚ | ⊚ | ⊚ | ⊚ | △ | × | △ | × |
| 22. | △ | × | × | × | × | × | × | × |
| 23. | ⊚ | ⊚ | ⊚ | ⊚ | △ | × | △ | × |
| 24. | △ | × | × | × | △ | × | △ | × |
| 25. | ⊚ | ⊚ | ⊚ | ⊚ | △ | △ | △ | △ |
| 26. | △ | × | × | × | △ | × | △ | × |
| 27. | ⊚ | ⊚ | ⊚ | ⊚ | △ | △ | △ | △ |
| 28. | △ | × | △ | × | △ | × | △ | × |
| 29. | ⊚ | ⊚ | ⊚ | ⊚ | △ | × | △ | × |

Note
Standards of evaluation of the corrosion resistance and adhesion are the same as in Table 3.

What is claimed is:

1. A process for the preparation of a highly anticorrosive surface-treated steel plate, which comprises subjecting a plated surface of a steel plate having a plating layer of the zinc or aluminum type to the following treatments:

(a) subjecting the steel plate to a chromate treatment to form a chromate film, (b) treating the steel plate with an organic composite silicate solution comprising an organic resin, a colloidal silica compound and a silane compound and containing an epoxy resin in an amount of at least 15% by weight based on the total solids to form an organic composite silicate film formed on said chromate film and consisting essentially of colloidal silica, organic resin and silane in an amount deposited of 0.5 to 4.0 g/m² on the chromate film, and (c) heat-treating the steel plate at a temperature of 100° to 300° C.

2. A process according to claim 1, wherein the steel plate is treated with an organic composite silicate solution containing an epoxy resin in an amount of at least 26% by weight, based on the total solids and having an SiO₂/organic resin weight ratio of from 60/40 to 10/90, preferably from 50/50 to 20/80, to form an organic composite silicate film on the chromate film and the steel plate is heat-treated at a temperature of 250° to 300° C.

3. A process according to claim 1 or 2, wherein the steel plate having a plating layer of the zinc type is a steel plate having a plating layer of Zn, an Ni-Zn alloy, an Fe-Zn alloy, a Zn-Mn alloy, a Zn-Al alloy or a Zn-Co-Cr alloy, a steel plate having a plating layer of at least one element selected from Ni, Fe, Mn, Co, Al and Cr, incorporated into one of the foregoing plating components, or a steel plate having at least two same or different plating layers selected from the foregoing plating layers.

4. A process according to claim 1 or 2, wherein the chromate treatment is carried out so that the chromate film is deposited in an amount of 1 to 1000 mg/m², preferably 10 to 200 mg/m², as chromium.

5. A process according to claim 1 or 2, wherein the chromate treatment is a coating type chromate treatment.

6. A process according to claim 1 or 2, wherein the chromate treatment is an electrolytic chromate treatment.

7. A process according to claim 1 or 2, wherein the chromate treatment is a reaction type chromate treatment.

8. A process according to claim 1 or 2, wherein the organic composite silicate is an epoxy composite silicate or a mixture of an epoxy composite silicate with at least one other organic composite silicate.

9. A process according to claim 1 or 2, wherein at least one additive selected from oxyacids of molybdenum, tungsten and vanadium, salts thereof and alkoxide chelates of titanium and zirconium are incorporated into the organic composite silica in an amount of up to 14% by weight based on the total solids of the organic resin and SiO₂.

10. A process for the preparation of a highly anticorrosive surface-treated steel plate, which comprises subjecting a plated surface of a steel plate having a plating layer of the zinc type or aluminum type to the following treatments:

(a) subjecting the steel plate to a chromate treatment to form a chelate film, (b) treating the steel plate with an organic composite silicate solution comprising an organic resin, a colloidal silica compound and a silane compound and containing an epoxy resin in an amount of at least 15% by weight based on the total solids, in which a curing agent is incorporated, to form an organic composite silicate film formed on said chromate film and comprising colloidal silica, organic resin and silane in an amount of 0.4 to 4.0 g/m² on the chromate film, and (c) heat-treating the steel plate at a temperature of 100° to 350° C.

11. A process according to claim 10, wherein the steel plate is treated with an organic composite silicate solution containing an epoxy resin in an amount of at least 26% by weight based on the total solids and having an SiO₂/organic resin weight ratio of from 60/40 to 10/90, preferably from 50/50 to 20/80, to form an organic composite silicate film on the chromate film and the steel plate is heat-treated at a temperature of 250° to 350° C.

12. A process according to claim 10 or 11, wherein at least one member selected from melamine, a blocked isocyanate, urea, a phenol, a polyamide, an amino resin, an amine, an organic acid, an inorganic acid, an alcohol, a mercaptan and an acid anhydride is incorporated as the curing agent in the organic composite silicate solution in an amount of 0.1 to 100 parts by weight, preferably 0.3 to 50 parts by weight, per 100 parts by weight of the epoxy resin in the organic composite silicate.

13. A process according to claim 10 or 11, wherein the steel plate having a plating layer of the zinc type is a steel plate having a plating layer of Zn, an Ni—Zn alloy, an Fe—Zn alloy, a Zn—Mn alloy, a Zn—Al alloy or a Zn—Co—Cr alloy, a steel plate having a plating layer of at least one element selected from Ni, Fe, Mn, Co, Al and Cr, incorporated into one of the foregoing plating components, or a steel plate having at least two same or different plating layers selected from the foregoing plating layers.

14. A process according to claim 10 or 11, wherein the chromate treatment is carried out so that the chromate film is deposited in an amount of 1 to 1000 mg/m², preferably 10 to 200 mg/m², as chromium.

15. A process according to claim 10 or 11, wherein the chromate treatment is a coating type chromate treatment.

16. A process according to claim 10 or 11, wherein the chromate treatment is an electrolytic chromate treatment.

17. A process according to claim 10 or 11, wherein the chromate treatment is a reaction type chromate treatment.

18. A process according to claim 10 or 11, wherein the organic composite silicate is an epoxy composite silicate or a mixture of an epoxy composite silicate with at least one other organic composite silicate.

19. A process according to claim 10 or 11, wherein at least one additive selected from oxyacids of molybdenum, tungsten and vanadium, salts thereof and alkoxide chelates of titanium and zirconium are incorporated into the organic composite silicate in an amount of up to 14% by weight based on the total solids of the organic resin and SiO₂.

20. A process according to claim 1, 2, 10 or 11, wherein one surface of a steel plate having both the surfaces deposited with a plating layer of the zinc type is subjected to the chromate treatment, the organic composite silicate solution treatment and the heat treatment.

21. A process according to claim 1, 2, 10 or 11, wherein one surface of a steel plate having both the surfaces deposited with a plating layer of the zinc type is plated with iron or an iron-zinc alloy having an iron content of at least 50% by weight and the other surface is subjected to the chromate treatment, the organic composite silicate solution treatment and the heat treatment.

22. A process according to claim 2, wherein said epoxy resin is present in an amount of at least 35% by weight.

23. A process according to claim 9, wherein said alkoxide chelates are incorporated into said organic composite silicate in an amount of up to 14% by weight.

24. A process according to claim 11, wherein said epoxy resin is present in an amount of at least 35% by weight.

25. A process according to claim 19, wherein said alkoxide chelates are incorporated into said organic composite silicate in an amount of up to 14% by weight.

* * * * *